April 20, 1943.  W. H. JOHNSON  2,316,793
INFINITELY VARIABLE SPEED TRANSMISSION
Filed Jan. 22, 1940  15 Sheets-Sheet 1
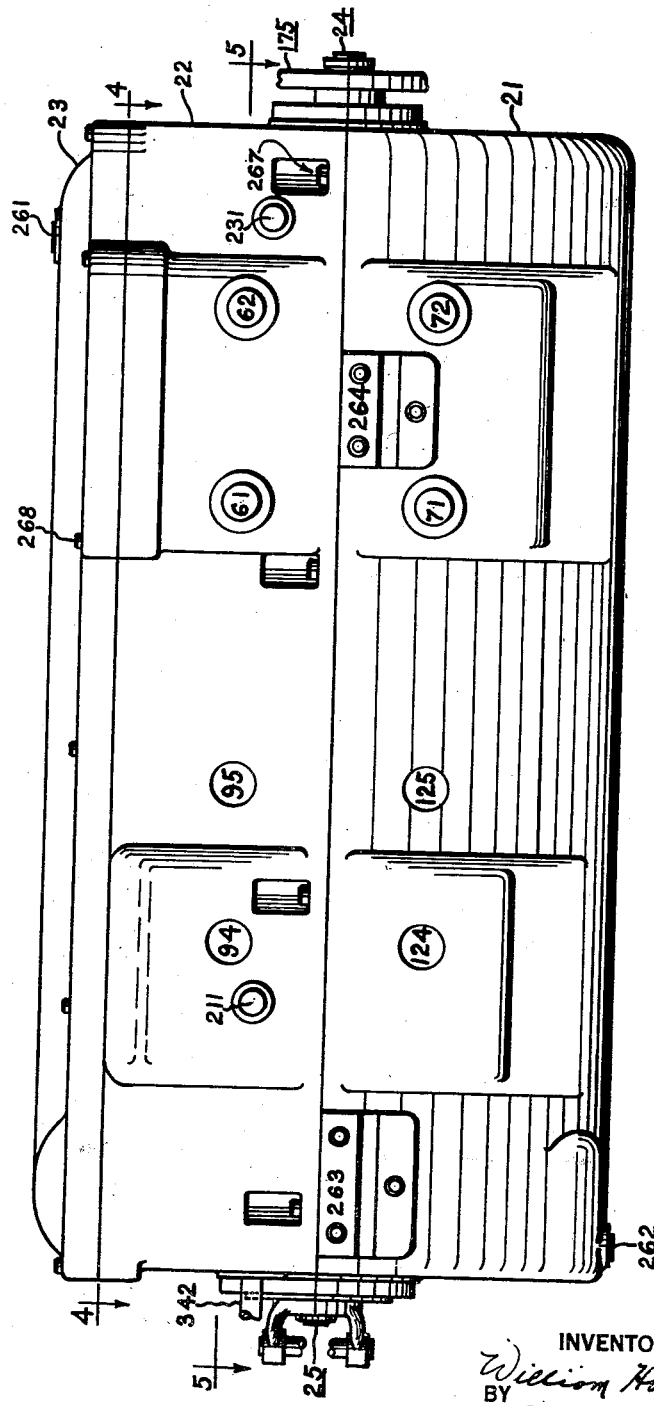
INVENTOR
William Horace Johnson
BY Albert M. Austin
ATTORNEY April 20, 1943.                    W. H. JOHNSON                    2,316,793
                    INFINITELY VARIABLE SPEED TRANSMISSION
                    Filed Jan. 22, 1940           15 Sheets-Sheet 2

INVENTOR
William Horace Johnson
BY
Albert M. Austin
ATTORNEY

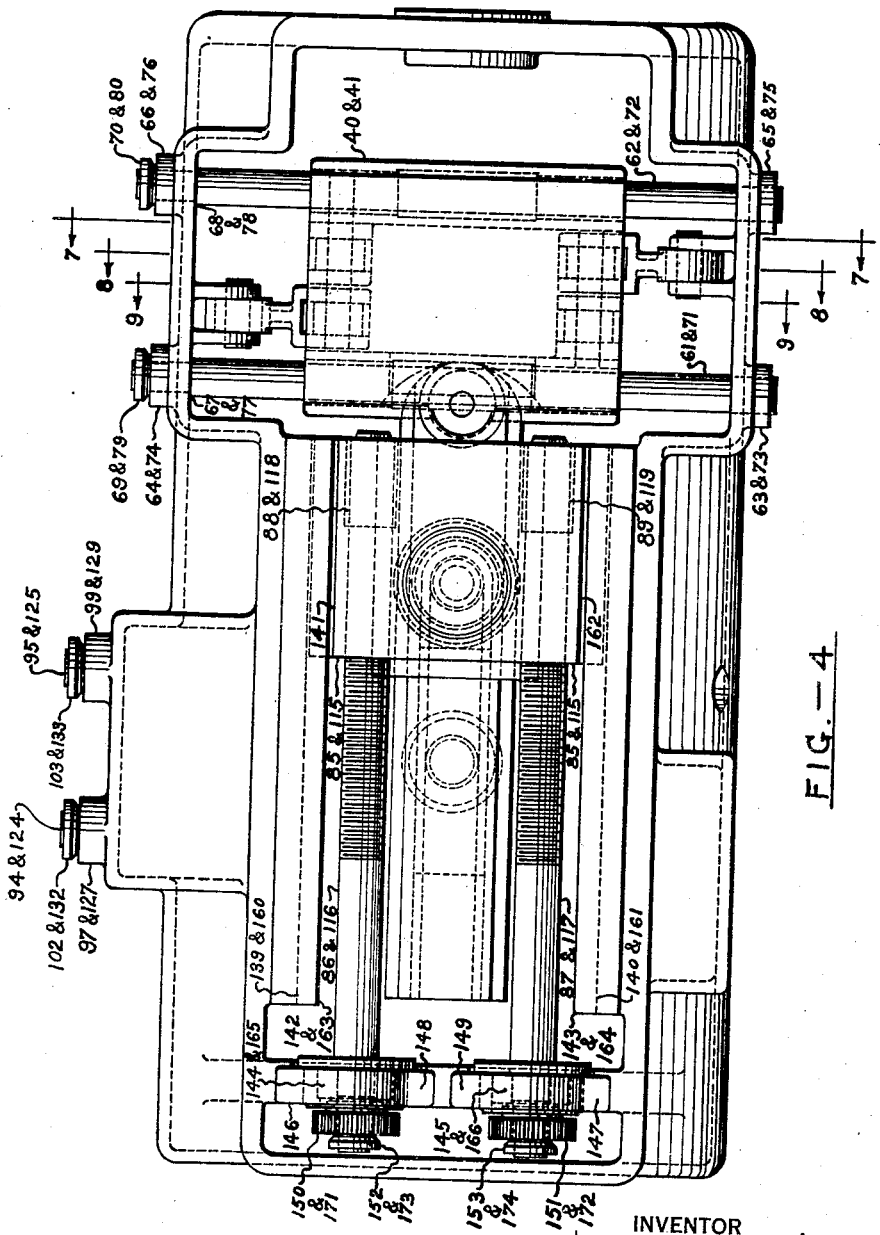

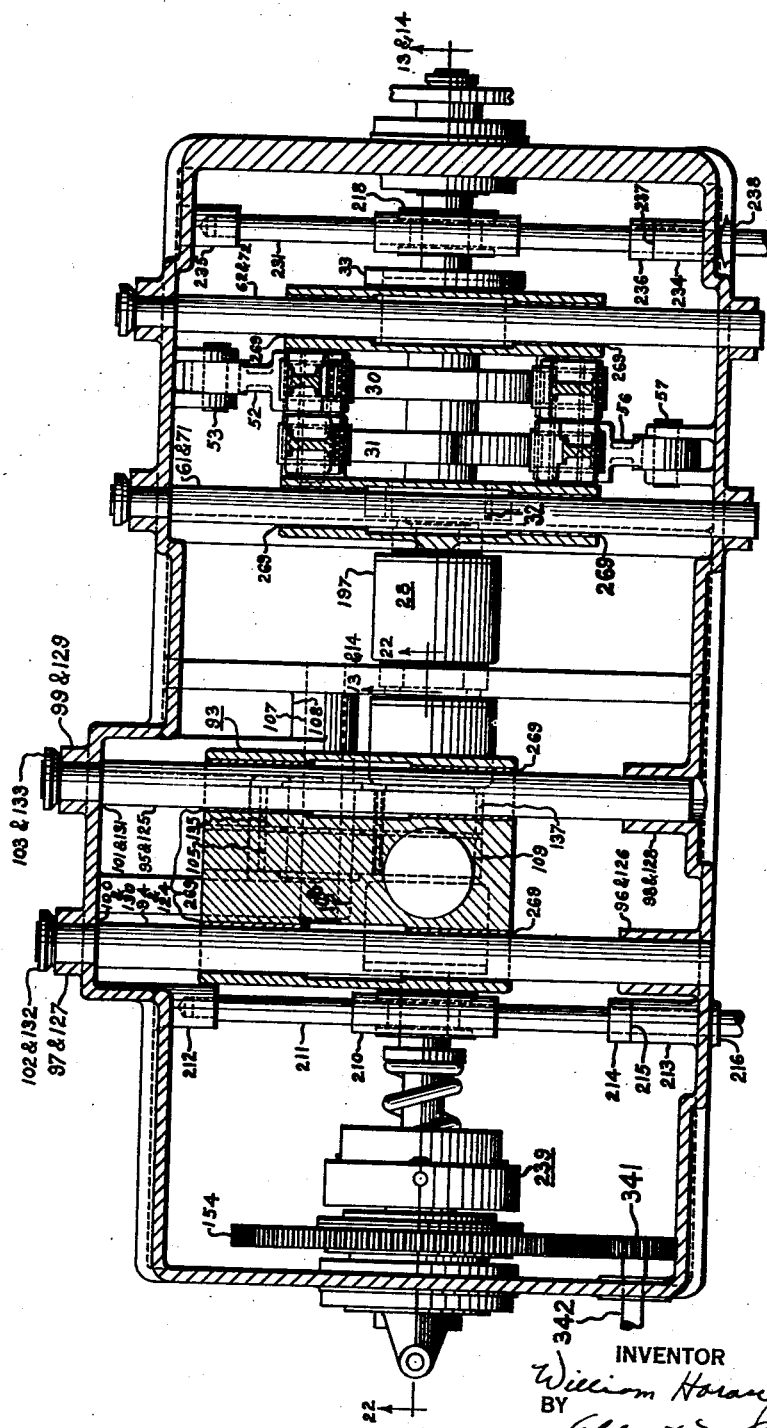

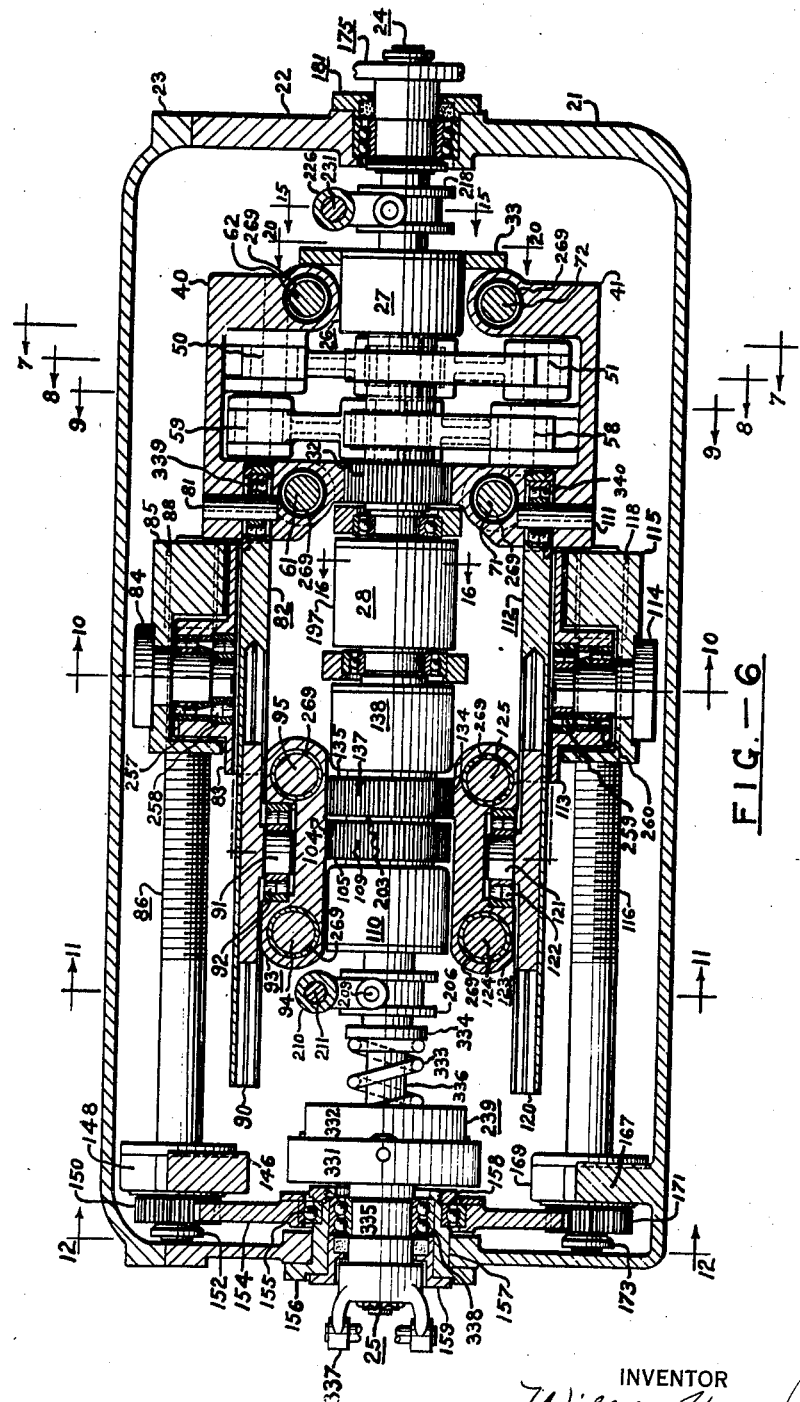

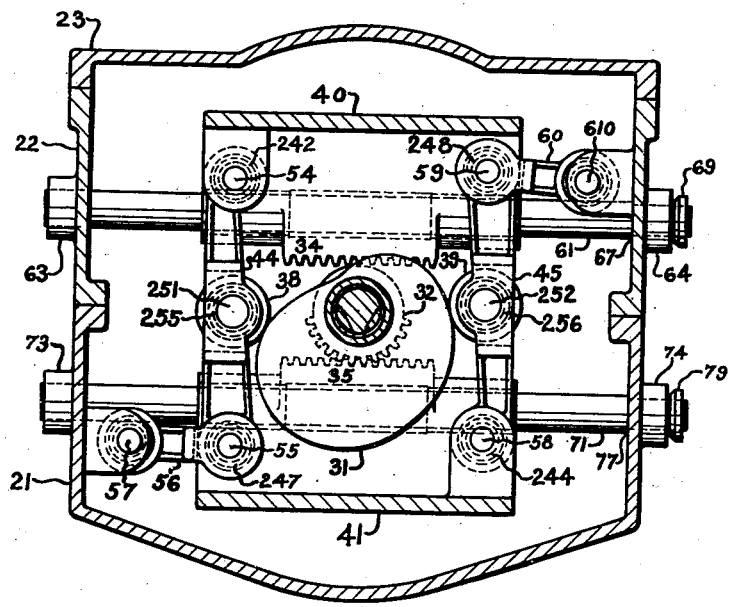
FIG.—9
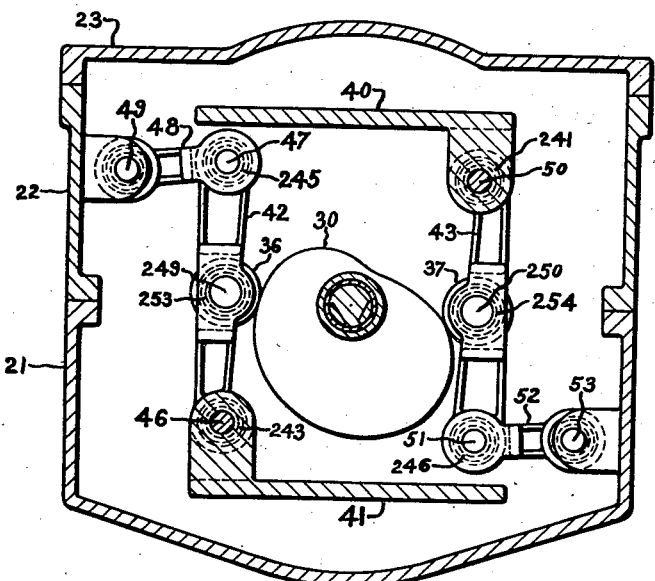
FIG.—7

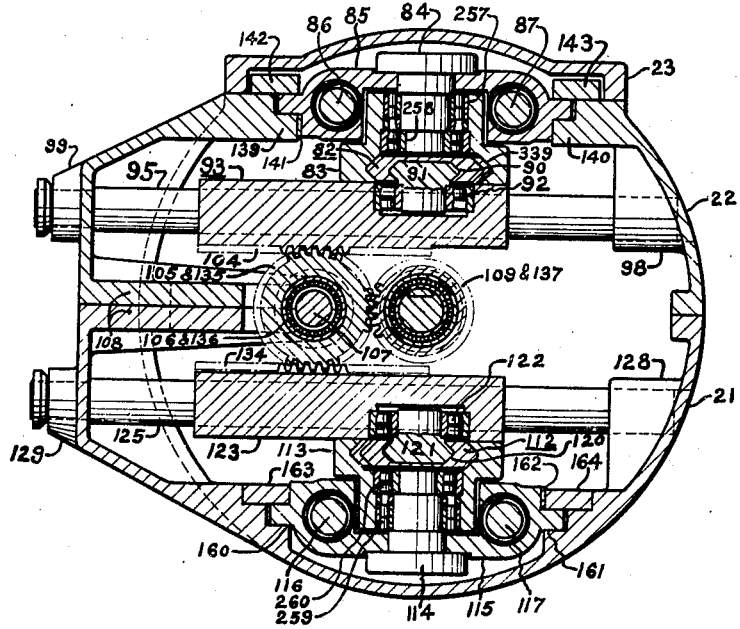
FIG.—10
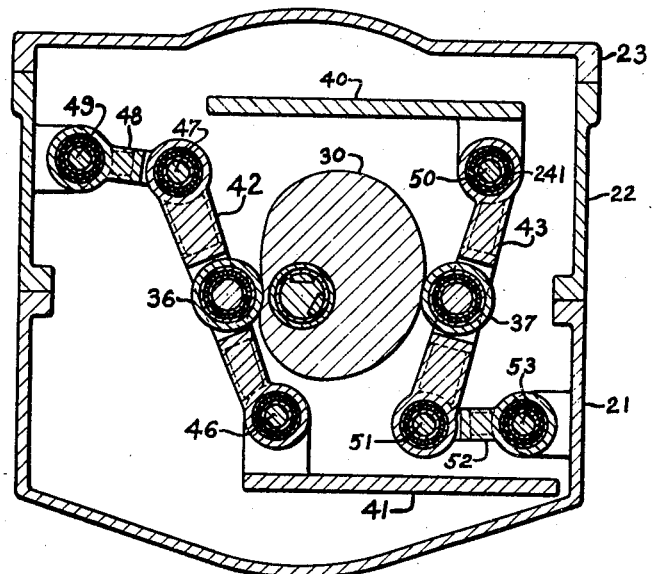
FIG.—8

April 20, 1943. W. H. JOHNSON 2,316,793
INFINITELY VARIABLE SPEED TRANSMISSION
Filed Jan. 22, 1940 15 Sheets-Sheet 9
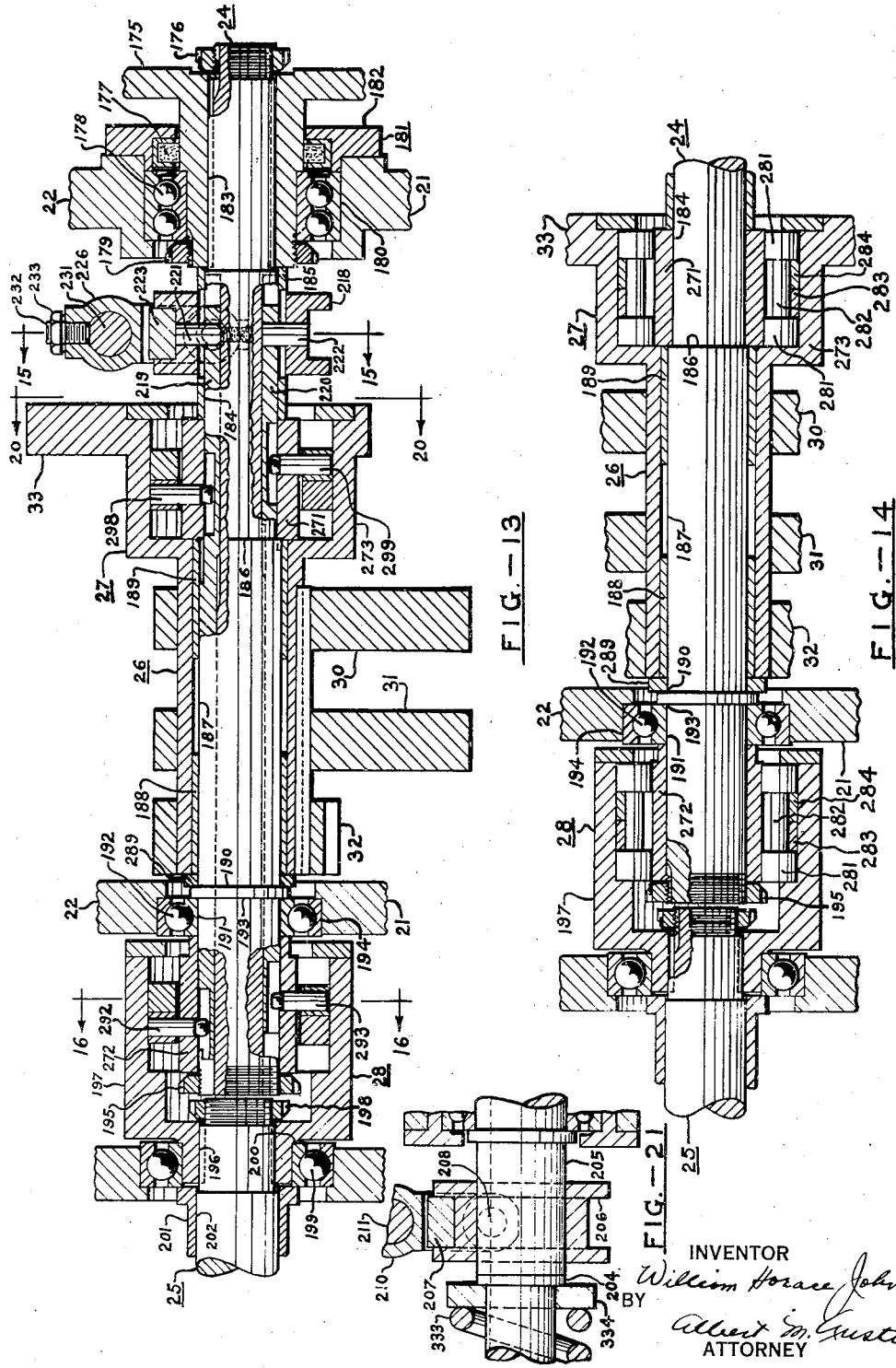
INVENTOR
William Horace Johnson
BY
Albert M. Gustin
ATTORNEY

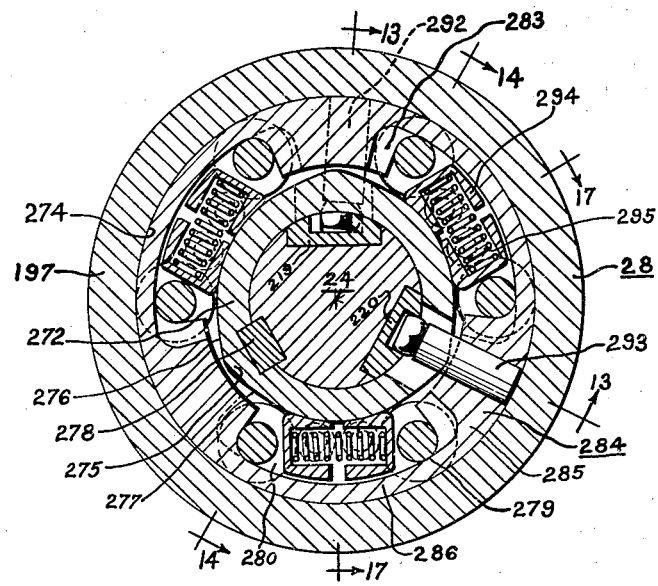
FIG.—16
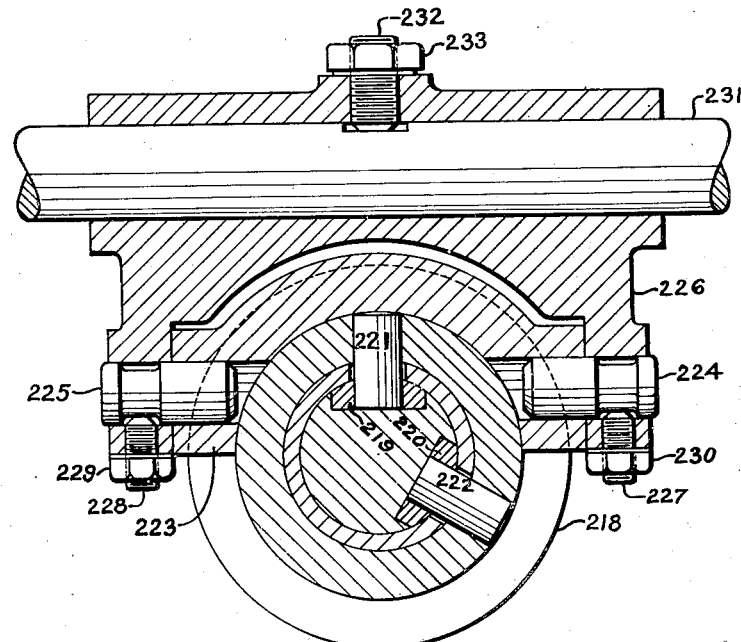
FIG.—15

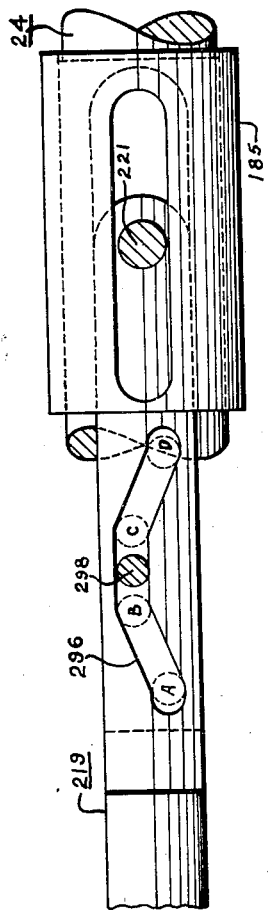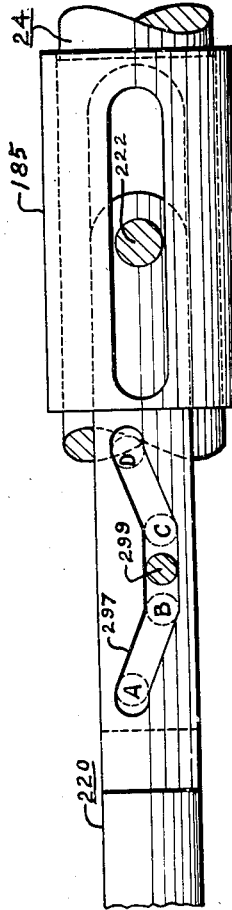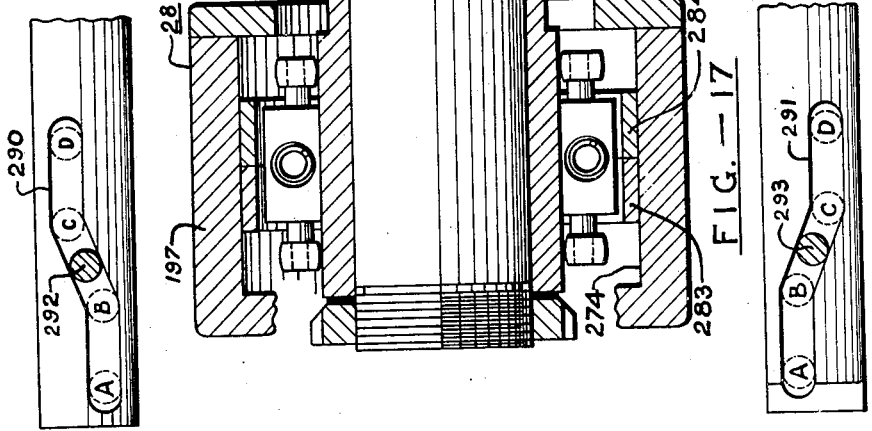

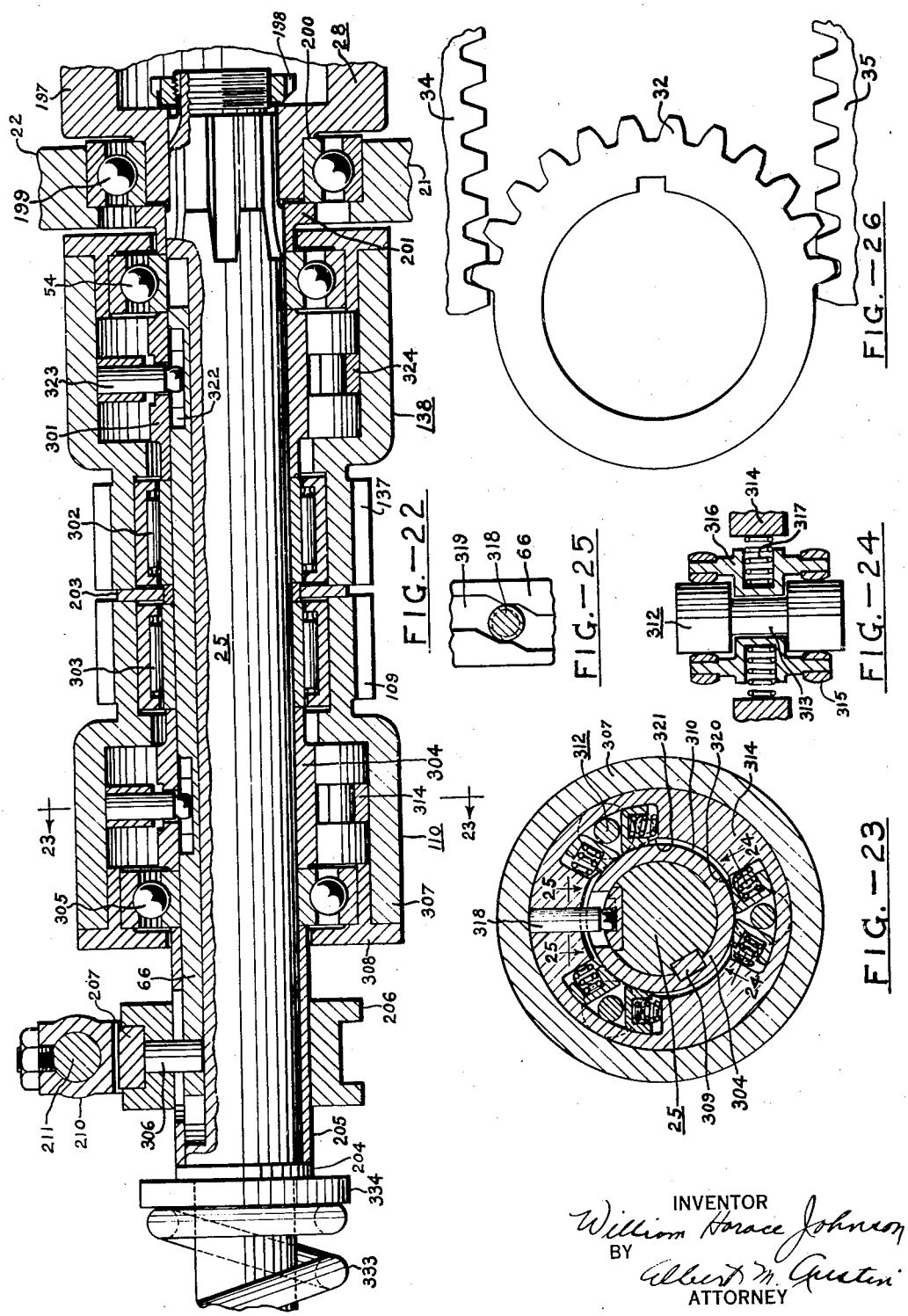

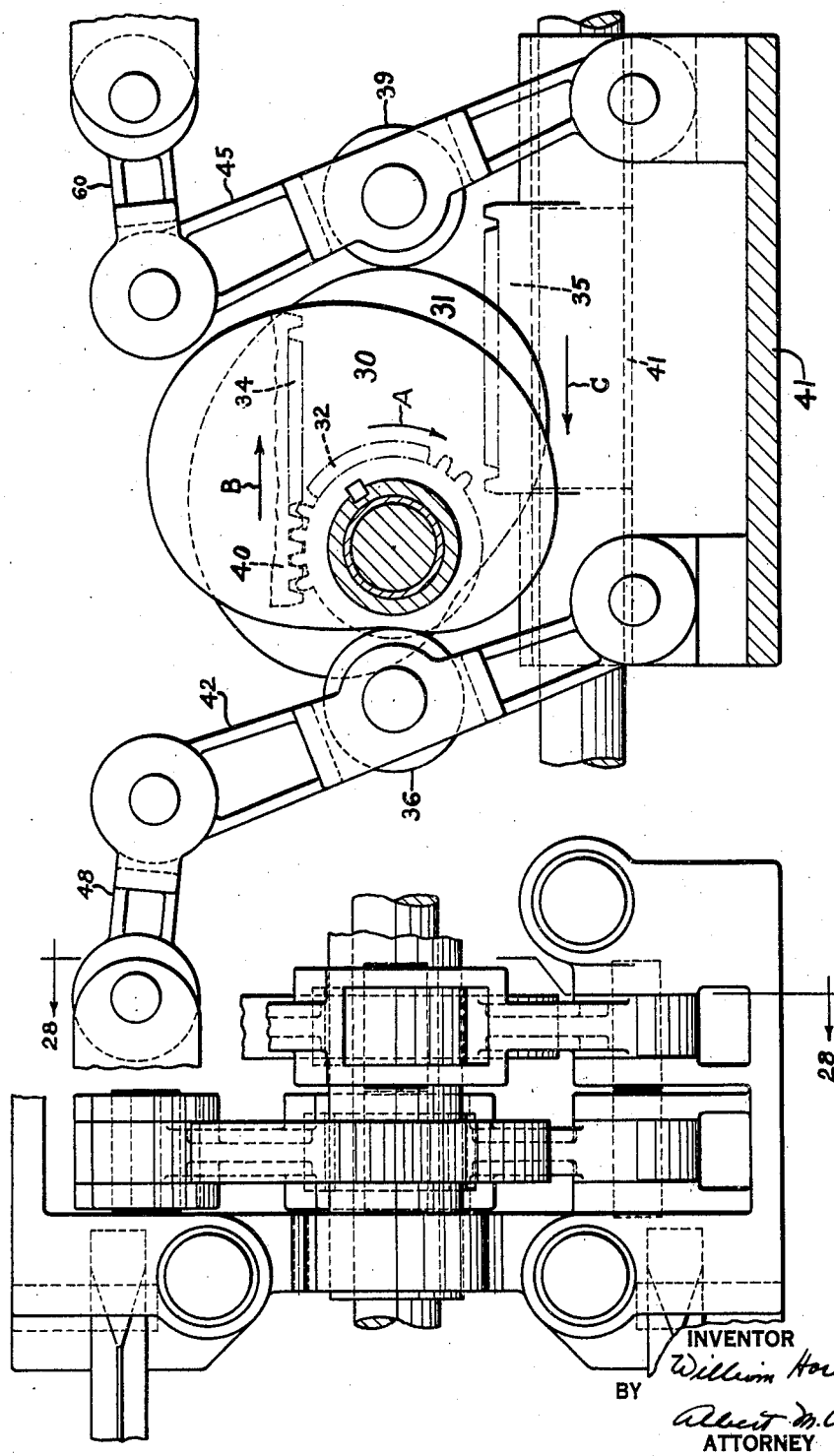

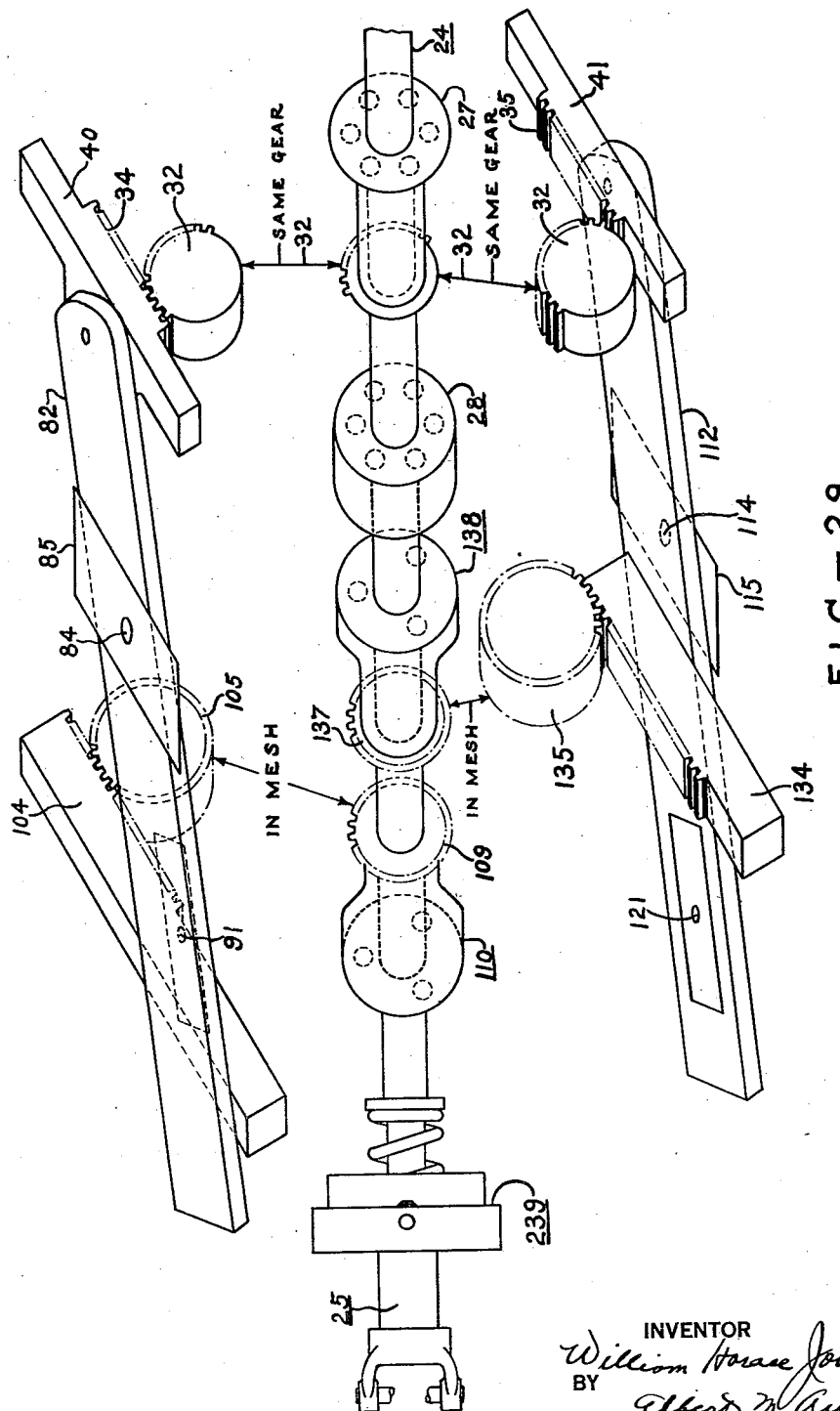

April 20, 1943.  W. H. JOHNSON  2,316,793
INFINITELY VARIABLE SPEED TRANSMISSION
Filed Jan. 22, 1940  15 Sheets-Sheet 15
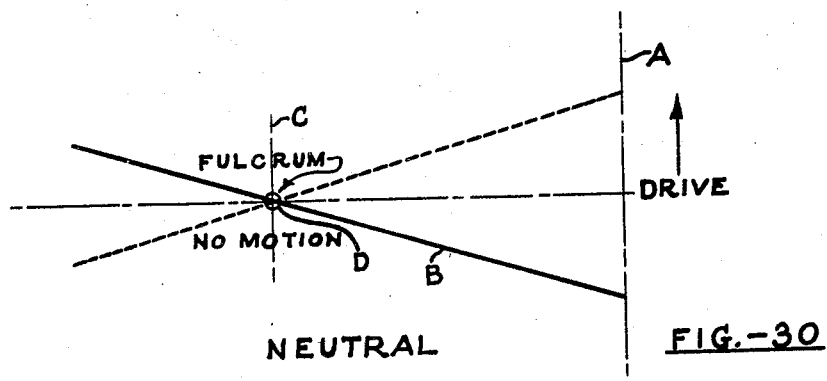
NEUTRAL  FIG.-30
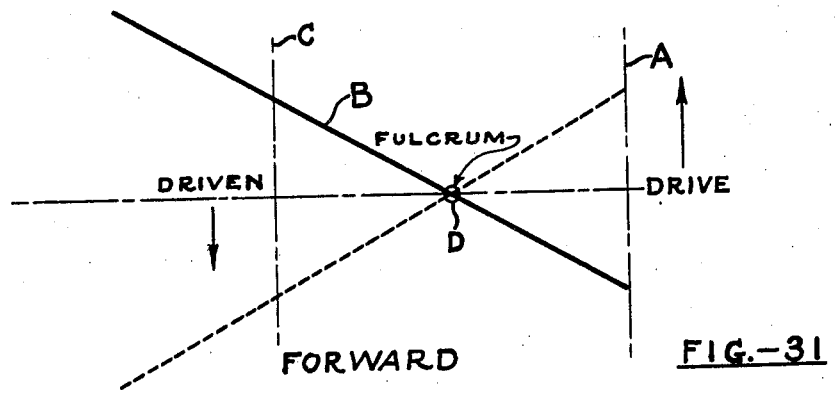
FORWARD  FIG.-31
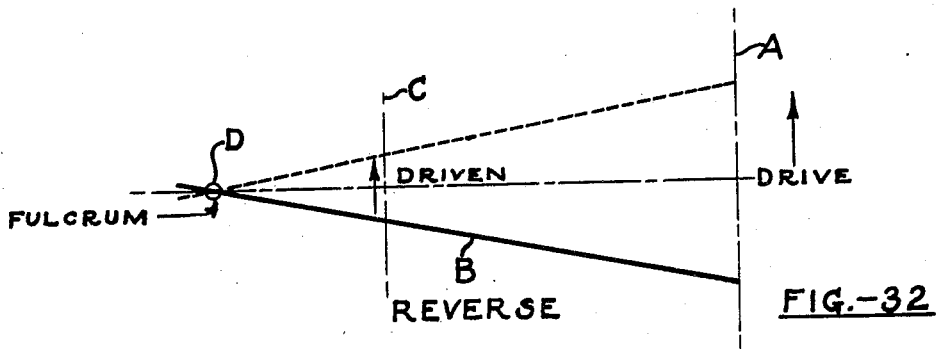
REVERSE  FIG.-32
INVENTOR
William Horace Johnson
BY
Albert M. Austin
ATTORNEY Patented Apr. 20, 1943

2,316,793

UNITED STATES PATENT OFFICE 2,316,793

INFINITELY VARIABLE SPEED TRANSMISSION

William Horace Johnson, Cranston, R. I., assignor to Weskenson Corporation, Providence, R. I., a corporation of Rhode Island Application January 22, 1940, Serial No. 314,930

31 Claims. (Cl. 74—124)

The invention relates to transmission and more particularly to transmissions having infinitely variable speed ratios.

According to a preferred form, the transmission comprises a driving member in the form of a cam, or a discontinuous or segment gear, or both, driving reciprocating slide or rack members. Each rack member is connected to a working beam having a fulcrum point whose position is adjustable to vary the speed ratio. The working beams drive reciprocating driven racks which drive respective overrunning clutches on the driven shaft. If desired, a master clutch may be interposed between the driving shaft and the driving cams or discontinuous gear and a second master clutch may be interposed between driving and driven shafts, these clutches acting in conjunction. The second master clutch may be engaged for direct drive, after which the first clutch may be disengaged to throw out the reciprocating slides and working beams from operation. If desired, a special torque limiting device may be incorporated in the driven shaft to protect the transmission and related parts from the high torques which may be developed when the transmission is adjusted to provide high ratios.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is an outside side elevation of the transmission complete;

Fig. 4 is a plan view taken on the line 4—4 of Fig. 1;

Fig. 5 is a plan section taken on the line 5—5 of Fig. 1;

Fig. 6 is a vertical longitudinal section taken on the line 6—6 of Fig. 2;

Fig. 7 is a vertical section taken on the line 7—7 of Fig. 6;

Fig. 8 is a vertical section taken on the line 8—8 of Fig. 6 with lower slide shown at end of its stroke;

Fig. 9 is a vertical section taken on the line 9—9 of Fig. 6;

Fig. 10 is a vertical section taken on the line 10—10 of Fig. 6;

Fig. 13 is a vertical section taken on the lines 13—13 of Figs. 5 and 16;

Fig. 14 is a vertical section taken on the lines 14—14 of Figs. 5 and 16;

Fig. 15 is a vertical section taken on the line 15—15 of Fig. 6;

Fig. 16 is a vertical section taken on the line 16—16 of Fig. 6;

Fig. 17 is a vertical section taken on the line 17—17 of Fig. 16;

Fig. 18 is a view of one of the control sliding key assemblies shown in Figs. 13 and 16;

Fig. 19 is a view of the other control sliding key assemblies shown in Figs. 13 and 16;

Fig. 20 is a view of the counterbalance taken on the line 20—20 of Fig. 6;

Fig. 21 is a detail illustrating the collar for operating the control key for the overrunning clutches;

Fig. 22 is a longitudinal section through the driven shaft taken on the line 22—22 of Fig. 5;

Fig. 23 is a section taken on the line 23—23 of Fig. 22;

Fig. 24 is a section taken on the line 24—24 of Fig. 23;

Fig. 25 is a section taken on the line 25—25 of Fig. 23;

Fig. 26 is a fragmentary diagrammatic view illustrating the relation between the segment gear and the racks and illustrating the transfer of the power drive from one rack to the other;

Fig. 27 is a vertical section illustrating the relation between the control cams and followers and between the segment gear and power racks;

Fig. 28 is a section on the line 28—28 of Fig. 27;

Fig. 29 is a diagrammatic view illustrating the general layout of the transmission;

Figs. 30, 31 and 32 are diagrammatic views illustrating the operation of the working beams for changing the speed ratio from forward through neutral to reverse.

Figure 3:
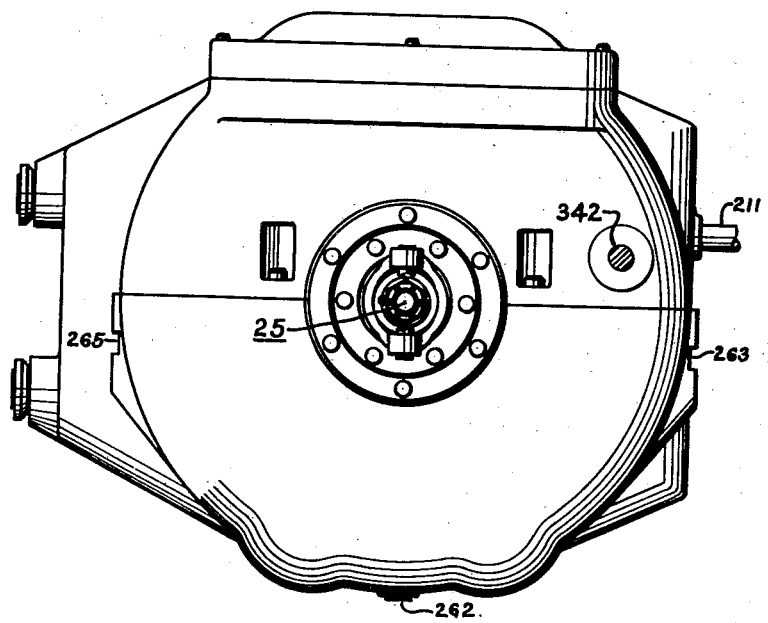
Fig. 3 is an outside rear end elevation of the transmission complete.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 2:
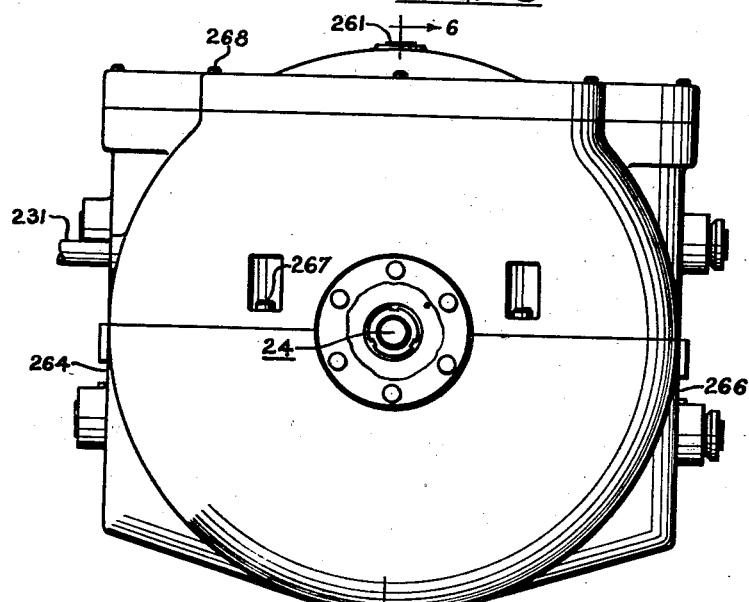
Fig. 2 is an outside front end elevation of the transmission complete.

Referring now to Figs. 1, 2 and 3, the transmission consists, in general, of a two-part case, a lower part 21, an upper part 22 and cover 23, a driving shaft 24 adapted to be connected to an automobile or other prime mover and a driven shaft 25 adapted to be connected to a propeller shaft of an automobile or other load shaft. Cover 23 has a filling device for lubrication at 261. Case 21 has draining means at 262. Case 21 has mounting supports at 263, 264, 265 and 266. Cases 21 and 22 are bolted together by a series of screws 267. Cover 23 is bolted to upper case 22 by a series of screws 268.

The invention will first be briefly described with reference to Fig. 29. Located between the driving shaft 24 and driven shaft 25 within the case are the operating parts shown diagrammatically in Fig. 29. The drive shaft 24 is connected through a suitable main clutch 27 to an intermittent gear 32 meshable with a pair of racks 34 and 35 mounted on reciprocating slides 40 and 41. Suitable cams are provided operating on suitable followers for controlling the movement of said slides 40 and 41 to cause the racks 34 and 35 alternately to engage said intermittent gear. These slides 40 and 41 are connected to working beams 82 and 112 which are fulcrumed on suitable fulcrum slides 85 and 115, slidable to vary the speed ratio. The driven ends of the working beams are pivoted to driven slides carrying rack members 104 and 134, driving pinions 105 and 135 which are connected through overrunning clutches 110 and 138 to the driven shaft 25. A disconnect clutch 28 directly connects drive shaft 24 with driven shaft 25. A suitable torque limiting device 239 may be incorporated in driven shaft 25 to prevent breakage of connected parts under the very high torques obtainable with very high ratios.

Main clutches 27 and 28 may be interconnected so that one is engaged while the other is disengaged, and vice versa, with provision for overlap to prevent break in power flow. For direct drive clutch 28 is engaged and clutch 27 is disengaged, thus providing a direct drive from shaft 24 through to shaft 25 without driving any of the reciprocating or oscillating parts. To obtain speed change, clutch 27 is engaged and clutch 28 is disengaged, thus driving the intermittent gear 32, reciprocating the slides 40 and 41 back and forth. This in turn reciprocates the working beams 82 and 112 about their fulcrum points, which in turn reciprocate the driven racks 104 and 134, which in turn drive gears 105 and 135, which in turn drive the driven shaft 25 through the overrunning clutches 110 and 138.

The construction and operation of these parts are explained more in detail hereinafter.

Referring now to Fig. 13, the parts more or less directly associated with drive shaft 24 will now be described. On outer end of driving shaft 24, on splined portion 183, is mounted an adapter 175 to which, in the case of a motor vehicle drive, a flywheel can be bolted. This adapter is secured by nut 176. On the hub of adapter 175 is mounted an oil seal 177 and an anti-friction bearing 178 secured in place by nut 179. Bearing 178 is mounted in bore 180 at the junction of cases 21 and 22. The outside diameter of oil seal 177 and the outer ring of bearing 178 contact end plate 181 which is bolted to cases 21 and 22 by a series of screws (not shown) passing through flange 182.

Between adapter 175 and sleeve 271 of master clutch 27 on portion 184 of shaft 24 is mounted a spacer 185. Sleeve 271 contacts shoulder 186 of shaft 24. Portion 187 of shaft 24 provides a running fit for two bushings 188 and 189 secured in housing 26. Washer 289 provides a running fit between shoulder 190 of shaft 24 and housing 26.

On portion 191 is mounted an anti-friction bearing 192 which contacts shoulder 193 of shaft 24. Bearing 192 is mounted in seat 194 at joint of cases 21 and 22. Sleeve 272 of master clutch 28 contacts inner race of bearing 192 and is secured in position by nut 195 which is at the extreme inner end of driving shaft 24.

The internal construction of master clutches 27 and 28 are identical so a description of clutch 28 will suffice for both. Referring now also to Figs. 14, 16 and 17, the inner surface of cage body 197 is formed to provide a cylindrical rollway 274. The outer surface of sleeve 272 forms a cooperating rollway having three raised portions 275, each of which has tapered surfaces 276 and 277. Ring 272 is suitably keyed to shaft 24 by key 278.

Disposed in the rollways are three pairs of double rolls 279, 280. These rolls are identical in construction, each comprising enlarged cylindrical ends or drums 281 connected by a reduced mid-portion 282.

For controlling the positions of double rolls 279 and 280 with respect to the tapered portions 276, 277, two similar control rings 283 and 284 are provided. Each control ring has three enlargements or abutments 285 and reduced connecting portions 286. The two connecting portions 286 are fitted side by side within the reduced mid-portions 282 of the double rolls, as indicated particularly in Fig. 14.

For rotatably shifting the control rings 283, 284, sliding keys 219, 220 are provided, these keys being set in shaft 24. Keys 219 and 220 have camways 290, 291 (Figs. 18 and 19) in which work pins 292, 293 having rounded heads. Pin 292 is connected to control ring 283 and pin 293 is connected to control ring 284.

For holding the main rolls 279 and 280 against the abutments 285 of the main control rings 283, 284, a series of spring assemblies are provided. Each spring assembly comprises a pair of shoes 294 having spaced rollers journalled thereon contacting the drums 281 of the rolls 279, 280 (like rollers 315 in Fig. 24). Shoes 294 have seats in which are disposed helical springs 295. The cooperation between rolls 279, 280 and tapered surfaces 276 and 277 depends upon the relative positions of these parts, which in turn are controlled by the positions of sliding keys 219 and 220.

Sliding keys 219, 220 have additional camways 296 and 297 for pins 298, 299 secured to similar control rings for controlling master clutch 27.

The master clutches 27 and 28 are controlled by the sliding keys 219, 220. For operating keys 219, 220 the following construction is provided. On spacer 185 (Fig. 13) is slidably mounted a thimble 218 secured to sliding keys 219 and 220 by pins 221 and 222. In groove of thimble 218 (Fig. 15) is mounted a shifting shoe 223 supported on two pivot pins 224 and 225, which are secured in fork 226 by two screws 227, 228 and lock nuts 229, 230, respectively.

Fork 226 is secured to shaft 231 by key (not shown) and screw and lock nut 232 and 233, respectively. Shaft 231 has two bearings 234 and 235 (Fig. 5) in case 22. Endwise movement of shaft 231 is restrained by collar 236 against end of boss 237 and by suitable control connection (not shown) against the outer end of boss 238.

Referring now to Figs. 6, 16, 18 and 19, the operation of clutches 27 and 28 will be described. The shift fork 226 and keys 219 and 220 are shown in their midway or central positions. When the thimble 218 is at its extreme right-hand position (Fig. 6) the keys 219 and 220 are likewise in their extreme right-hand positions and pins 298 and 299 of clutch 27 and pins 292 and 293 of clutch 28 are at positions indicated by A, Figs. 18 and 19. The pins are now in such position as to hold the double rolls 279 and 280 of both clutches away from their tapered surfaces 276 and 277 and no drive can be transmitted through either clutch.

This condition exists only when pivots 84 and 114 and 91 and 121, respectively, are in line as shown in Fig. 30, and explained later, and is governed by a control mechanism (not shown). This position is for the purpose of allowing the engine, as in an automobile, to be started and warmed up without operating any of the working parts of the device but is never used to throw out the mechanism while under power. Means for throwing out under power will be explained later.

When thimble 218 is moved to the left from position A (Fig. 6), the keys 219 and 220 are likewise moved to the left so that pins 298 and 299 of clutch 27 and pins 292 and 293 of clutch 28 take the positions shown at B. From the shape of the camways, it will be seen that no movement has been imparted to pins 292 and 293 of clutch 28, but pins 298 and 299 of clutch 27 have moved apart, moving control rings 283 and 284 to permit the springs 295 of the spring assemblies to move both double rolls 279 and 280 against the tapered surfaces 276 and 277, thus tightly locking the case 273 to ring 271 of clutch 27 so that power may be transmitted in either direction of rotation.

When this has taken place and the engine is running, the fulcrum points 84 and 114 can be operated in either direction, either manually or automatically through the control mechanism (not shown), to provide any ratio, infinitely, between the driving and driven shafts.

When the speed of the driven shaft 25 equals the speed of the driving shaft 24, the control mechanism (not shown) moves the thimble 218 still further to the left, and keys 219 and 220 cause pins 298 and 299 of clutch 27 and pins 292 and 293 of clutch 28 to take the position indicated by C. It will be seen that no motion has taken place to affect clutch 27 but pins 292 and 293 of clutch 28 have moved away from each other, moving control rings 283 and 284 to permit the springs 295 of the spring assemblies to move both double rolls 279 and 280 against the tapered surfaces 276 and 277, thus tightly locking the case 197 to ring 272 of clutch 28 so that power may be transmitted in either direction of rotation. It will be noted that at this point both clutches 27 and 28 are engaged. Now, as the keys 219 and 220 continue their movement to the left, the pins 298 and 299 of clutch 27 and pins 292 and 293 of clutch 28 take the positions shown at D. When in this position, it will be seen that pins 292 and 293 of clutch 28 have not changed their positions and that clutch 28 remains in its engaged position, but pins 298 and 299 of clutch 27 have moved together, moving rings 283 and 284 which move the double rolls 279 and 280 away from the tapered surfaces 276 and 277, thus disengaging clutch 27 which throws out the gear, cams, reciprocating slides and working beams from operation and permitting direct drive from driving shaft 24 to driven shaft 25.

To return from direct drive to any lower speed of the driven shaft, the thimble 218 and keys 219 and 220 are moved to the right (Figs. 6, 18 and 19) from their extreme left-hand position, and the aforesaid functions are reversed, namely, clutch 27 engages and brings the gear, cams, racks and working beams into action, under no load, while direct drive clutch is still engaged. Then clutch 28 releases, disconnecting shafts 24 and 25. The adjustable fulcrums can then operate for variable ratios. When the pivots 84 and 114 are in line with pivots 91 and 121, respectively, where no motion or drive is imparted to the driven shaft (Fig. 30) then and only then can the keys 219 and 220 be moved to the extreme right, as described above.

Thus the clutches 27 and 28 have four main positions: A, no drive through either clutch; B, clutch 28 released and clutch 27 locked; C, both clutches locked; and D, clutch 28 locked with clutch 27 released.

For a more detailed disclosure of master clutches 27 and 28, attention is called to copending application Serial No. 304,489, filed November 15, 1939.

Referring now to Figs. 22–25, the parts more or less closely associated with driven shaft 25 will now be described. On the inner splined end of driven shaft 25 is the housing 197 of master clutch 28, which is secured by nut 198. On the hub of housing 197 is mounted an anti-friction bearing 199 whose inner race contacts shoulder 200 of housing 197 and a spacer 201 which fits on shaft 25. Bearing 199 is seated in the case.

The other end of spacer 201 contacts the inner race of anti-friction bearing 54 which in turn abuts sleeve 301 of overrunning clutch 138. Thence the following members are placed in abutting relation on shaft 25—inner race of bearing 302, spacers 203, inner race of anti-friction bearing 303, sleeve 304 of overrunning clutch 110, inner race of bearing 305 and sleeve 205 which abuts against collar 204, integral with shaft 25. All these parts are clamped against collar 204 of shaft 25 by nut 198 on end of shaft 25.

Figure 11:
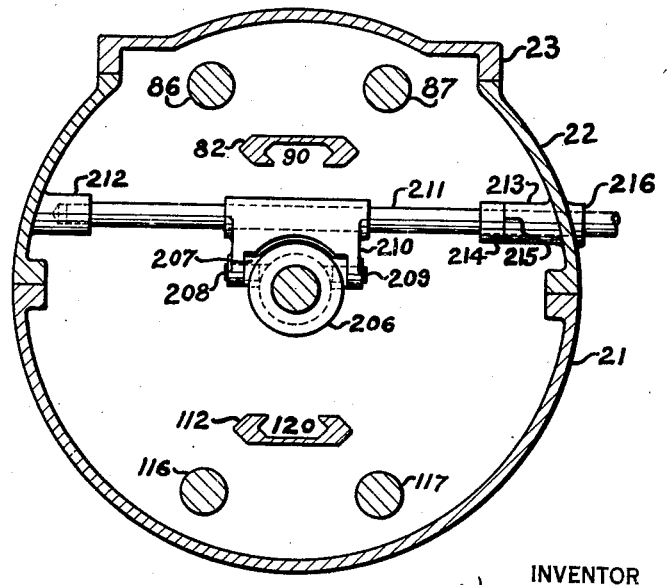
Fig. 11 is a vertical section taken on the line 11—11 of Fig. 6.

On sleeve 205 of shaft 25 is slidably mounted clutch thimble 206 (Figs. 6, 21, 22) secured to sliding key 66 by pin 306. In the groove of thimble 206 is mounted shifting shoe 207 (see also Fig. 11) supported on two pivot pins 208 and 209 which are secured in clutch fork 210. Fork 210 is fixed to shaft 211 which has a bearing at either end, 212 and 213, in case 22. Endwise movement of shaft 211 is restrained by collar 214 against boss of bearing 216 and by suitable control connection (not shown) against the outer end of bearing boss 216.

A torque limiting device 239 (Figs. 5, 6, 22 and 29) is incorporated in the driven shaft 25. The driven shaft 25 is broken for this purpose, the rear part, indicated by 335 (Fig. 6), being secured to plate 331, and the forward part, indicated by 336, being secured to driving plate 332. The driven shaft portion 335 is part of a universal joint 337 to which the load is connected. Shaft 335 is journalled in the case by a suitable bearing 338. Plate 331 has a series of rollers radially journalled therein and plate 332 has radially extending, axially facing recesses in which the rollers seat. The coil spring 333 operating against collar 334, which is mounted on shaft 335 against collar 204, yieldably holds the rollers and grooves in engagement.

For normal operating torques, the spring 333 is sufficient to prevent relative movement between plates 331 and 332. When safe torques are exceeded, the pressure of spring 333 is not sufficient to hold the rollers and grooves in engagement and these plates may slide one upon the other until the excess torque is removed, at which time the rollers automatically re-seat themselves in the grooves.

For a more complete disclosure of this self-contained torque limiting device, attention is called to copending application Serial No. 308,109, filed December 8, 1939.

The internal construction of overrunning clutches 110 and 138 are similar so a description of clutch 110 will suffice for both. Referring now also to Figs. 22-25, cage 307 has a gear 109 secured thereto seating the outer race of bearing assembly 303. A cap 308 closes one end of cage 307 and seats the outer race of roller bearing assembly 305.

Fitted around shaft 25 and keyed thereto at 309 is the ring 304 with three specially shaped raised portions 310. Fitted between the bore of cage 307 and the ring 304, between the raised portions 310, are three double rolls 312. Each double roll 312 has enlarged roll or drum portions connected by a reduced portion 313. Fitted into bore of cage 307 and free to move therein is a control ring 314 held sideways in the space formed by the reduced portions 313 of rolls 312.

Bearing on rolls 312, on each side, are smaller contact rollers 315 (Fig. 24). These are axially curved or rounded and are carried on spring blocks 316 and held against rolls 312 by springs 317 bearing against spring blocks 316 and ring 314. Control ring 314 is recessed in three places to receive springs 317, spring blocks 316 and rolls 312.

Also fitted and held in control ring 314 is a pin 318 having a rounded head which bears in cam groove 319 in sliding key 66. By moving sliding key 66 axially of shaft 25 one way or the other from the neutral position shown, the ring 314 is turned one way or the other, making the rolls 312 effective on tapers 320 or tapers 321 of the raised portions 310 of ring 304 for overrunning operation in one direction or the other.

As illustrated, the device in its neutral position with the control pin 318 in the central portion of groove 319 of sliding key 66 and with the rolls 312 held in their free positions between the raised portions 310 of control ring 304 by the balanced springs 317. In this position the cage 307 is free to revolve relative to the shaft 25 in either direction.

Sliding key 66 has a second camway 322 in which works pin 323 secured to control ring 324 for similarly controlling clutch 138. This clutch is also shown in its neutral position. The cam grooves 319 and 322 are so shaped that shifting of the sliding key 66 rotates the control rings 314 and 324 in the same direction. Shifting of the control rings disturbs the balance between the spring assemblies positioning the double rolls, causing the rolls to engage one set of tapered surfaces 320, or the other set 321, depending on the direction of shift of the control ring. Thus, when the sliding key 66 is shifted, say, to the left in Fig. 22, clutches 110 and 138 have overrunning characteristics in such directions as to impart continuous rotation to the driven shaft 25 in one direction. Shifting of key 66 to the right from neutral in Fig. 22 reverses the direction of continuous rotation of the driven shaft 25.

For a more detailed disclosure of clutches 110 and 138, attention is called to copending application Serial No. 304,488, filed November 15, 1939.

Referring now to Figs. 5 and 13, the operating parts of the transmission will now be described. On drive sleeve 26 of clutch 27 is secured two cams 30 and 31 and an intermittent gear 32 and on housing 273 is a counterbalance 33 for counterbalancing the off-center characteristics of these members and thereby placing the entire driving assembly on shaft 24 in static and dynamic balance (see Fig. 20).

Intermittent gear 32 (Fig. 9) meshes racks 34 and 35 on carrier slides 40 and 41 respectively. Cam 30 (Figs. 7 and 8) is in contact with follower rolls 36 and 37. Cam 31 (Fig. 9) is in contact with follower rolls 38 and 39. Roll 36 is mounted in lever 42; roll 37 is mounted in lever 43; roll 38 is mounted in lever 44 and roll 39 is mounted in lever 45.

The driven end of lever 42 is mounted on slide 41 (Figs. 7 and 8) at pivot 46. The fulcrum end of lever 42 is at pivot 47 of lever 48 which is mounted at pivot 49 of case 22. The driven end of lever 43 is mounted on slide 40 at pivot 50. The fulcrum end of lever 43 is at pivot 51 of lever 52 mounted at pivot 53 of case 21. The driven end of lever 44 is mounted on slide 40 at pivot 54. The fulcrum end of lever 44 is at pivot 55 of lever 56 mounted at pivot 57 of case 21. The driven end of lever 45 is mounted in slide 41 at pivot 58. The fulcrum end of lever 45 is at pivot 59 of lever 60 mounted at pivot 610 of case 22.

Pivots 50 and 54 are secured in slide 40 and on them and in bosses of levers 43 and 44 are mounted anti-friction bearings 241 and 242. Pivots 46 and 58 are secured in slide 41 and on them and in bosses of levers 42 and 45 are mounted anti-friction bearings 243 and 244. Pivots 47, 51, 55 and 59 are secured in levers 48, 52, 56 and 60 and on them and in bosses of levers 42, 43, 44 and 45 are mounted anti-friction bearings 245, 246, 247 and 248, respectively. Rolls 36, 37, 38 and 39 are mounted on pivots 249, 250, 251 and 252 which are secured in levers 42, 43, 44 and 45 and on these pivots and inside rolls 36, 37, 38 and 39 are mounted anti-friction bearings 253, 254, 255 and 256.

Driving slide 40 is guided in a straight line motion by two rods 61 and 62 fixed in the walls of case 22 (Fig. 6). One end of rods 61 and 62 (Fig. 4) is free to move axially in sleeves 63 and 65 in the case, while other ends are held axially in the case between shoulders 67 and 68 and nuts 69 and 70. This is to take care of expansion and contraction. Similarly, driving slide 41 is guided in a straight line motion by two rods 71 and 72 supported in sleeves 73, 74, 75 and 76, respectively, in walls of case 21. One end of rods 71 and 72 is free to move axially in sleeves 73 and 75, while other ends are held axially between shoulders 77 and 78 and nuts 79 and 80.

The inner side of slide 40 has a pivot 81 (Fig. 6) on which is mounted roller bearing 339, at which one end of working beam 82 is mounted and is free to oscillate thereon. Beam 82 is mounted in holder 83 (Fig. 10) and is free to slide therein on gib 339. Holder 83 is journalled on pivot 84 by bearing assemblies 257, 258. Pivot 84 is secured in fulcrum slide 85. Slide 85 is adjusted longitudinally by two screws 86 and 87. Screws 86 and 87 are mounted in nuts 88 and 89, respectively, which are secured in slide 85. At one end of beam 82 are internal ways 90 in which is mounted pivot slide 91, of which pivot end is mounted in bearing 92 of driven slide 93.

Driven slide 93 is guided in a straight line motion by two rods 94 and 95 supported in sleeves 96, 97, 98 and 99, respectively, in walls of case 22 (Figs. 5, 6 and 10). One end of rods 94 and 95 is free to move axially in sleeves 96 and 98, while other ends are held axially between shoulders 100 and 101 and nuts 102 and 103.

Driven slide 93 has a rack 104 (Fig. 10) secured thereto which meshes with a spur gear 105. Gear 105 is mounted on an anti-friction bearing 106 which in turn is mounted on a stud 107 which is secured in support 108, part of which is integral with one case 21 and part of which is integral with the other case 22. Gear 105 meshes with and drives gear 109 mounted on housing 307 of overrunning clutch 110 (Fig. 22).

The inner side of driving slide 41 has a pivot 111 on which is mounted roller bearing 340, at which one end of working beam 112 is mounted and is free to oscillate thereon. Beam 112 is mounted in holder 113 and is free to slide therein. Holder 113 is journalled on pivot 114 by bearing assemblies 259, 260 and pivot 114 is supported by slide 115. Slide 115 is adjusted longitudinally by two screws 116 and 117. Screws 116 and 117 are mounted in nuts 118 and 119, respectively, secured in slide 115.

At one end of beam 112 are internal ways 120 in which is mounted pivot slide 121 whose pivot end is mounted in bearing 122 of driven slide 123.

Driven slide 123 is guided in a straight line motion by two rods 124 and 125 which are supported in sleeves 126, 127, 128 and 129, respectively, in walls of case 21. One end of rods 124 and 125 is free to move axially in sleeves 126 and 128, while other ends are held axially between shoulders 130 and 131 and nuts 132 and 133.

Driven slide 123 has a rack 134 (Fig. 10) secured thereto which meshes with a spur gear 135 alongside gear 105. Gear 135 is mounted in an anti-friction bearing 136, which in turn is mounted on the above-mentioned stud 107 secured in support 108 at joint of cases 21 and 22. Gear 135 meshes with and drives gear 137 secured to the housing of overrunning clutch 138.

It will be noted that all driving and driven slides 40, 41, 93 and 123 have affixed thereto renewable bushings, indicated in general by 269, slidable on their respective rods.

Fulcrum slide 85 is guided in ways 139 and 140 (Fig. 10) in case 22 and is fitted sidewise by gib 141 and held down by two gibs 142 and 143. Screws 86 and 87 are mounted on anti-friction bearings 144 and 145 (Fig. 4) mounted in supporting bearing housings of case 22 and held down by caps 148 and 149. These bearings take radial and end thrusts of screws 86 and 87.

On splined end of screws 86 and 87 are mounted gears 150 and 151 (Fig. 12) which are secured in place by nuts 152 and 153. Gears 150 and 151 both mesh with central gear 154. Gear 154 is mounted on an anti-friction bearing 155 (Fig. 6) mounted on sleeve 156, which in turn is mounted in bore 157 between joint of housings 21 and 22. Bearing 155 is secured to sleeve 156 by nut 158. Sleeve 156 is secured by flange 159 to cases 21 and 221 by a series of screws (not shown).

Fulcrum slide 115 is guided in ways 160 and 161 (Fig. 10) in case 21 and is fitted sidewise by gib 162 and held down by gibs 163 and 164. Screws 116 and 117 are mounted in anti-friction bearings of case 21 and held down by caps 169 and 170. These bearings take the radial and end thrusts of screws 116 and 117. On splined end of screws 116 and 117 are mounted gears 171 and 172 which are secured in place by nuts 173 and 174. Gears 171 and 172 both mesh with central gear 154.

Figure 12:
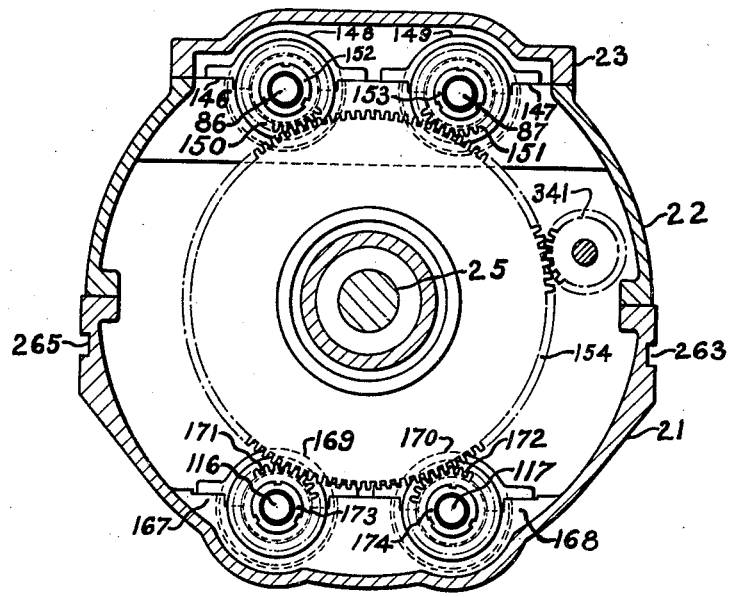
Fig. 12 is a vertical section taken on the line 12—12 of Fig. 6.

Central gear 154 is controlled by a pinion 341 on shaft 342 (Figs. 5 and 12). Rotation of shaft 342 by suitable control devices (not shown) moves fulcrum slides 85 and 115 uniformly without any binding of the operating screws.

For a clearer understanding of the operation of the control cams 30 and 31, segment gear 32 and racks 34 and 35, in addition to Figs. 7, 8 and 9, attention is called to Figs. 26, 27 and 28. There are two slides 40 and 41, two racks 34 and 35, two cams 30 and 31 and four followers 36, 37, 38 and 39. Each cam operates on two followers, one for each rack. This provides positive operation of each slide in each direction. It will be seen from Fig. 8 that clockwise rotation of cam 30 positively moves slides 40 to the right and slide 41 to the left. Likewise, it will be seen from Fig. 9 that clockwise rotation of cam 31 moves slide 41 to the right and slide 40 to the left.

In other words, as illustrated in Fig. 28, oppositely disposed followers 36 and 39 moving with slide 41 are held at substantially constant distances apart by the relation and shape of the cams 30 and 31. Similarly, followers 37 and 38 moving with slide 40 positively control the position of slide 40. Cams 30 and 31 may be exactly alike but positioned at the proper angle.

It will be noted that each follower system comprises a comparatively long swinging lever directly supporting the follower and pivoted to its respective slide, and a comparatively short connecting link connecting the free end of the swinging lever and adjacent fulcrum point on the casing. These levers obviate the necessity for any sliding action in any of the pivots. This peculiar lever construction must, of course, be taken into consideration in the design of the cams and assists in obtaining the desired harmonic motion as hereinafter explained more in detail.

Each slide 40 and 41 partakes of a "power" stroke in one direction and a "return" or "idle" stroke in the other direction for a given direction of rotation of the cams, the power strokes being in opposite directions. Cam 30 may be termed the "power" cam and cam 31 the "return" cam when the cams are operating in a clockwise direction in Figs. 7, 8, 9 and 28.

During the power stroke, the cam drive is reenforced by the engagement between the segment gear 32 and rack 34 or 35. For example, referring to Fig. 28, clockwise rotation (arrow A) of gear 32 is shown imparting to rack 34 its power stroke, moving rack 34 to the right. In Fig. 28 the arrows B and C indicate the directions of the power strokes of racks 34 and 35. When rack 34 reaches a point near the extreme right end of its power stroke, gear 32 engages rack 35 which has reached the right-hand end of its stroke and has started to return. Fig. 28 shows the relation of gear 32 just before engaging rack 35 and disengaging rack 34. The relation of the teeth on the gear 32 and on racks 34 and 35 is such that the gear 32 engages rack 35 before it disengages rack 34, thus producing an overlap in the power action, as shown particularly in Fig. 26. Further rotation of gear 32, clockwise in Fig. 28, drives rack 35 to the left on its power stroke. Near the left-hand end of the power stroke of rack 35, gear 32 engages rack 34 and disengages rack 35 in overlapping relation in a manner similar to the transfer of gear 32 from rack 34 to rack 35 at the right-hand end of the strokes of these racks.

The shapes of the cams 30 and 31 are such as to produce the same motion kinematically on the slides as the drive between segment gear 32 and racks while the latter are engaged, this being of constant linear velocity with constant angular velocity of the drive shaft. Since each rack is engaged with the segment gear for more than one-half revolution of the segment gear, the cam surfaces must be so shaped as to impart a quick return to the slides on their return or idle strokes.

For eliminating vibration, the cams must be so shaped as to gradually slow down each slide after its rack disengages the segment gear. The cam surfaces are shaped to provide a gravity or modified harmonic curve, gradually bringing the slides to rest at the ends of their strokes. This curve on the cams is such as to gradually decelerate each slide on its power stroke after disengaging the segment gear and then to gradually accelerate each slide during its idle or return stroke, giving it a quick return, then decelerating each slide at the end of its return stroke to zero, and then accelerating each slide at the beginning of its power stroke to a value equal to the uniform peripheral velocity of the segment gear at which point the segment gear engages its rack for the power stroke.

It will be understood that when the direction of rotation of the driving cams and segment gear is reversed, i. e. is counterclockwise in Fig. 28, cam 31 becomes the "power" cam and cam 30 the "return" cam.

The transmission may be provided with suitable manual controls for manual operation or it may be provided with suitable automatic controls for automatic operation. In either case suitable control levers or other devices (not shown) may be placed on the ends of clutch shafts 211 and 231 and fulcrum adjusting shaft 342.

The operation will be better understood by reference to Figs. 30–32 where line A denotes the line of motion of pivot points 81 and 111 on the driving ends of working beams 82 and 112, B, the working beams, C, the line of motion of pivot points 91 and 121 on the driven ends of the working beams, and D, the adjustable fulcrum pivots 84 and 114. In each figure the solid and dotted positions of the working beams represent their extreme positions of movement.

For manual operation in an automobile, for example, assume that the engine is idle, the clutch 27 engaged, clutch 28 disengaged and the fulcrum slide pivots 84 and 114 in line with the pivot points 91 and 121. Although driving slides 40 and 41 and working beams 82 and 112 are moving, no corresponding movement is imparted to driven racks 104 and 134. This position is represented in Fig. 30.

To accelerate the car, shaft 342 is rotated, rotating screws 86, 87, 116 and 117 moving fulcrum slides 85 and 115 to the right in Fig. 6, thus imparting a reciprocating motion to driven racks 104 and 134 and driving driven shaft 25 at reduced speed. As fulcrum slides 85 and 115 move further to the right in Fig. 6, driven shaft 25 is accelerated until a one-to-one speed ratio is reached, i. e. driven shaft 25 is rotated at the same speed as drive shaft 24. This position is represented by Fig. 31. At this time clutch 28 is engaged and immediately afterwards clutch 27 is released, there being a slight overlap in the operation of these clutches to eliminate any break in the continuity of driving action. The releasing of clutch 27 stops the motion of the reciprocating slides, working beams and driven racks, and the drive is now direct from drive shaft 24 through clutch 28 to driven shaft 25.

For shifting to a higher speed ratio, as for example, when coming to a grade, clutch 27 is engaged immediately followed by the disengagement of clutch 28, after which fulcrum slides 85 and 115 are moved to the left in Fig. 6 to change the speed ratio to a higher value. When it is desired to stop the car or throw it into neutral, the fulcrum slides 85 and 115 are moved so that their centers 84 and 115 coincide with pivot points 91 and 121, as indicated in Fig. 30.

To reverse the direction of the car from neutral position, the screws 86, 87, 116 and 117 are rotated in such direction as to move fulcrum slides 85 and 115 to the left in Fig. 6, thus again reciprocating driven racks 104 and 134. This position is indicated in Fig. 32. At the same time reverse shaft 211 is rotated, shifting overrunning clutches 110 and 138 to reverse the direction of overrunning action, thus imparting a drive to shaft 25 in the direction opposite to that of driving shaft 24.

It will be noted that, for forward operation of the driven shaft 25, the power strokes of driven racks 104 and 134 are in opposite directions to the power strokes of driving racks 34 and 35 because the fulcrum point of the working beams is between the lines of motion of these racks. When the fulcrum slides 85 and 115 are shifted to the position shown in Fig. 32 for reverse operation of driven shaft 25, the power strokes of driven racks 104 and 134 are in the same directions as the power strokes of driving racks 34 and 35. Thus, for reverse, not only is the direction of overrunning action of clutches 110 and 138 reversed, but also the power strokes of racks 104 and 134, thus utilizing the power strokes for driving in reverse as well as forward.

For automatic operation, control shaft 231 which operates master clutches 27 and 28, control shaft 211 which operates overrunning clutches 110 and 138 and the fulcrum adjusting shaft 342 are connected to automatic apparatus mounted on the vehicle so that all these parts are shifted either entirely automatically or partially automatically, governed by the speed, torque or any other condition of the vehicle or by the position of the accelerator pedal.

For emergency stopping, if desired, a second pedal corresponding to the present clutch pedal, in an automobile, may be provided for disconnecting plates 331 and 332 of the torque limiting device which remains disconnected only while clutch pedal is depressed as in the present clutch of an automobile.

Thus an infinitely variable transmission is provided which is rugged in construction and reliable in operation. All reciprocating parts, such as the driving and driven slides and working beams reciprocate in horizontal planes, thereby eliminating the effect of gravity. The transmission of power is uniform and continuous since the power strokes overlap and the velocity of all parts while transmitting power is constant with constant speed of rotation of the drive shaft. All acceleration and deceleration of reciprocating parts takes place while such parts are transmitting no power, thus reducing vibration to a minimum.

All clutches, including the main disconnect clutches and the overrunning clutches are of the overrunning type, utilizing spring pressed rollers operating in ways having wedging surfaces. The overrunning clutches take hold immediately on their power strokes, there being no lost motion. The elements of the main clutches grip with no lost motion when the clutches are so operated.

The provision of the intermittent gear provides positive gear-transmitted power at all times, the gears having true pitch line engagement, and the cams are provided mainly for control purposes to place the driving racks in proper position for engagement by the intermittent gear at proper times.

The transmission may be used in automotive work, such as trucks, busses, locomotives, pleasure cars and boats, and may also be used in ordinary machine work where infinitely variable speed ratios are often desired. In the case of light torques and small power, the intermittent gear and racks may be omitted, the driving forces being supplied entirely by the operation of the cams on their followers.

While certain novel features of the invention have been disclosed and are pointed out in the annexed claims, it will be understood that various omissions, substitutions and changes may be made by those skilled in the art without departing from the spirit of the invention.

What is claimed is:

1. In a transmission, a drive shaft having a segment gear, first and second racks mounted on opposite sides of said shaft for reciprocating movement transversely of said shaft, said racks being engageable alternately with said segment gear, control means for reciprocating said racks for causing each rack, at the beginning of its power stroke, to engage said gear at proper linear speed, said control means decelerating each rack at the end of its power stroke after disengagement with said segment gear, imparting a quick return to said rack and decelerating it at the end of its return stroke, and accelerating said rack at the beginning of its power stroke, said segment gear engaging the advancing rack before disengaging the other.

2. In a transmission, a drive shaft having a discontinuous gear, first and second separate gear members mounted on opposite sides of said shaft and for independent reciprocating movement transversely of said shaft, said gear members being engageable alternately with said discontinuous gear, and means for causing said gear members to engage and disengage said discontinuous gear at proper times.

3. In a transmission, a drive shaft having a discontinuous gear, first and second gear members mounted on opposite sides of said shaft and for reciprocating movement transversely of said shaft, said gear members being engageable alternately with said discontinuous gear, and means for causing said gear members to engage and disengage said discontinuous gear at proper times, the approaching gear member engaging said discontinuous gear before the departing gear member disengages said discontinuous gear.

4. In a cam and follower mechanism, a support, a drive shaft journalled on said support having a power cam and a return cam, an upper slide and a lower slide mounted above and below said shaft for horizontal movement transversely of said shaft, said upper slide having power and return arms pivotally depending therefrom on opposite sides of said shaft and connecting arms pivotally connecting the lower ends of said arms and adjacent part of said support, said lower slide having pivotally connected upstanding power and return arms on opposite sides of said drive shaft and connecting arms connecting the upper ends of said upstanding arms and the adjacent parts of said support, said power arms having followers engageable with opposite sides of said power cam, said return arms having followers engageable with opposite sides of said return cam.

5. In a cam and follower mechanism, a support, a drive shaft journalled on said support having a power cam and a return cam, first and second carriers on opposite sides of said shaft for movement transversely of said shaft, said first carrier having power and return arms pivotally connected thereto on opposite sides of said shaft and connecting arms pivotally connecting the free ends of said arms and adjacent part of said support, said second carrier having pivotally connected operating power and return arms on opposite sides of said drive shaft and connecting arms connecting the free ends of said operating arms and the adjacent parts of said support, said power arms having followers engageable with opposite sides of said power cam, said return arms having followers engageable with opposite sides of said return cam.

6. In power transmission, a drive shaft having first and second plate cams and a segment gear, first and second slide members mounted to reciprocate on opposite sides of, and transversely of, said drive shaft, each slide member having a rack engageable with said segment gear, a set of followers located substantially on diametrically opposite sides of each cam, each slide having one follower of each set connected thereto, whereby the first cam operates one slide in one direction and the other slide in the opposite direction, and the second cam imparts a return movement to said slides.

7. In a power transmission, a reciprocating member, a uniformly rotating member, said members having gear teeth engageable while said reciprocating member partakes of a power stroke at constant linear velocity, cam and follower devices associated with said rotating and reciprocating members for decelerating and accelerating said reciprocating member at the ends of its stroke, and for imparting a return movement to said reciprocating member, said gears being disengaged on the return stroke.

8. In a transmission, a guideway, a cross head adjustable lengthwise of said guideway, a fulcrum bearing carried by said cross head, a holder carried by said bearing, a working beam longitudinally slidable in said holder, said working beam carrying longitudinal ways, a carrier in said ways, a reciprocating driving device having a pivot connection to one end of said working beam, a reciprocating driven device having a pivot connection with said carrier.

9. In a transmission, a guideway, a cross head adjustable lengthwise of said guideway, a fulcrum bearing carried by said cross head, a holder carried by said bearing, a working beam longitudinally slidable in said holder, said working beam carrying longitudinal ways, a carrier in said ways, a reciprocating driving device having a pivot connection to one end of said working beam, a reciprocating driven device having a pivot connection with said carrier, said cross head being adjustable from a point between said pivot connections to a point beyond said last mentioned pivot connection.

10. In a transmission, a guideway, a cross head adjustable lengthwise of said guideway, a fulcrum bearing carried by said cross head, a holder carried by said bearing, a working beam longitudinally slidable in said holder, said working beam carrying longitudinal ways, a carrier in said ways, a reciprocating driving device having a pivot connection to one end of said working beam, a reciprocating driven device having a pivot connection with said carrier, said reciprocating driving and driven devices traversing parallel straight paths, the amplitude of travel of said driving device being constant, the amplitude of travel of said driven device being proportional to the distance of said fulcrum bearing from the path of said driven device.

11. In a transmission, a pair of working beam structures, each structure comprising a longitudinally adjustable cross head, a holder journalled in said cross head, a working beam slidable on said holder, a carrier longitudinally slidable on said working beam, reciprocating driving devices pivoted to one end of said working beams respectively, reciprocating driven devices pivoted to said carriers respectively, a driven shaft, each driven device comprising a rack, each rack having a pinion and an overrunning clutch between the pinion and said driven shaft, said overrunning clutches, both imparting driving force in the same direction to said driven shaft, means for changing the direction of overrunning action of said clutches, means for adjusting said cross heads so that the fulcrum points of said working beams may be positioned on either side of said carrier and means for applying overlapping driving forces to said driving devices.

12. In a transmission, a set of longitudinally extending, spaced ways, a cross head having guide members in said ways, said cross head having a central recess, and holding recesses between said central recess and said guide members, nut members in said holding recesses, adjusting screws passing through said nut members, a stud shaft secured to said cross head, a holding member having a bearing surrounding said stud shaft within said central recess, said holding member having longitudinally extending internal ways, a working beam slidably mounted in said holding member ways, a driving member pivoted to one end of said working beam, said working beam having internal ways, a carrier within said working beam ways having a pivot point, a driven member secured to said pivot point, gears on said adjusting screws and a central control gear engaging said gears to adjust said cross head.

13. In a transmission, a set of longitudinally extending ways, a cross head having guide members in said ways, said cross head having nut members, adjusting screws passing through said nut members, a stud shaft secured to said cross head, a holding member having a bearing surrounding said stud shaft, said holding member having longitudinally extending ways, a working beam slidably mounted on said ways, a driving member pivoted to one end of said working beam, said working beam having ways, a carrier on said working beam ways having a pivot point, and a driven member secured to said pivot point.

14. In an infinitely variable mechanical transmission, a drive shaft, a disconnect clutch connected thereto, a set of cams and a sector gear connected to the driven element of said disconnect clutch, a set of transversely slidable cross heads having followers driven by said cams, each cross head carrying a rack adapted to mesh the teeth of said gear, a second set of transversely slidable cross heads, racks on said second cross heads, pinions meshing said second racks, an overrunning clutch driven by each pinion, a driven shaft driven by said overrunning clutches, separate working beams connecting said first and second cross heads, fulcrums for said working beams, and means for adjusting the fulcrum points of said fulcrums and a second disconnect clutch between said drive and driven shafts.

15. In an infinitely variable mechanical transmission, a drive shaft, a disconnect clutch connected thereto, a set of cams and a sector gear connected to the driven element of said disconnect clutch, a set of transversely slidable cross heads having followers driven by said cams, each cross head carrying a rack adapted to mesh the teeth of said gear, a second set of transversely slidable cross heads, racks on said second cross heads, pinions meshing said second racks, an overrunning clutch driven by each pinion, a driven shaft driven by said overrunning clutches, separate working beams connecting said first and second cross heads, fulcrums for said working beams, means for adjusting the fulcrum points of said fulcrums on opposite sides of said second cross heads, a second disconnect clutch between said drive and driven shafts, each of said first cross heads having a power stroke in one direction and a return stroke in the other direction, the power strokes being in opposite directions, said overrunning clutches cooperating to impart torque to said driven shaft in the same direction, and means for reversing the direction of overrunning action of both said overrunning clutches simultaneously.

16. In an infinitely variable mechanical transmission, a drive shaft, a disconnect clutch connected thereto, a driving device connected to the driven element of said disconnect clutch, a set of transversely slidable cross heads driven by said driving device, a second set of transversely slidable cross heads, a driven shaft driven by said second set of cross heads, separate working beams connecting said driving and driven cross heads, fulcrums for said working beams, means for adjusting the fulcrum points of said fulcrums, and a second disconnect clutch between said driven and drive shafts.

17. In a variable speed transmission, a drive shaft, a driven shaft, first and second clutches connected to said drive shaft, variable speed ratio devices between said first clutch and said driven shaft, said second clutch being connected to said driven shaft for direct drive, a control member simultaneously operating both clutches and having a first position in which no drive may be transmitted through either clutch; a second position in which said second clutch is released and said first clutch is locked; a third position in which both clutches are locked; and a fourth position in which said second clutch is locked and said first clutch is released.

18. In a variable speed transmission, a drive shaft, a driven shaft, first and second clutches connected to said drive shaft, variable speed devices between said first clutch and said driven shaft, said second clutch being directly connected to said driven shaft, said first clutch being engaged and said second clutch disengaged while said variable speed devices are transmitting power, a control member for engaging said second clutch when said variable speed devices have brought the speed of said driven shaft to equal that of the drive shaft, and thereafter disengaging said first clutch, whereby said drive and driven shafts may be direct connected and said variable speed devices rendered inoperative for direct drive.

19. In a transmission, a drive shaft, a first clutch comprising a cage journalled on said drive shaft, driving devices carried by said cage, a driven shaft aligned with said drive shaft, a second clutch having a cage attached to said driven shaft, said clutches having sleeves secured respectively to said drive shaft, said sleeves and cages providing annular rollways, each said sleeve having raised portions which have oppositely tapered surfaces, each clutch having pairs of rolls disposed between its rollways and between its raised portions, a plurality of control rings, each control ring having internal abutments providing recesses for its rolls, a spring assembly for each pair of rolls urging the rolls of its pair apart, said control rings having pins, two axially slidable control keys, each key having a cam slot for each clutch, said pins being located in their respective cam slots, a collar on said drive shaft secured to said keys, and means for axially shifting said collar, said keyways being so shaped that said clutches have the following successive positions: (1) both clutches disconnected; (2) the second clutch released and first connected; (3) both clutches connected; and (4) the second clutch connected and first clutch released.

20. In a transmission, a drive shaft, a first clutch comprising a cage journalled on said drive shaft, driving devices carried by said cage, a driven shaft aligned with said drive shaft, a second clutch having a cage attached to said driven shaft, said clutches having sleeves secured respectively to said drive shaft, said sleeves and cages providing annular rollways, each said sleeve having raised portions which have oppositely tapered surfaces, each clutch having pairs of rolls disposed between its rollways and between its raised portions, a plurality of control rings, each control ring having internal abutments providing recesses for its rolls, a spring assembly for each pair of rolls urging the rolls of its pair apart, said control rings having pins, axially slidable control keys having cam slots in which said pins are located, and means for axially shifting said keys to adjust said clutches to the following positions: (1) both clutches disconnected; (2) the second clutch released and first connected; (3) both clutches connected; and (4) the second clutch connected and first clutch released.

21. In a transmission, a driven shaft, over-running clutches comprising cages journalled on said shaft, sleeves fixed to said shaft, each sleeve having raised portions which have oppositely tapered surfaces, each clutch having rolls between its cage and sleeve and between its raised portions, a control ring having recesses for said rolls, each control ring having a pin, an axially adjustable key located in a groove in said shaft within both said sleeves, said key having camways in which said pins are located, a collar surrounding said shaft and secured to said key, said collar being axially movable to shift both said control rings, each said cage having a gear secured thereto, oscillatory driving members meshing said gears, said driving member having power strokes in opposite directions, whereby said power members supplement each other to impart substantially constant power to said driven shaft in a single direction, said direction being reversed when said collar is shifted.

22. In a transmission, a drive shaft, a reciprocating driving carrier having a power stroke and a return stroke driven by said drive shaft, a driven carrier, a working beam connected to said driving and driven carriers, a fulcrum for said working beam, a driven shaft, an overrunning clutch on said driven shaft, a pinion connected to said clutch, a rack meshing said pinion and driven by said driven carrier, means for adjusting said fulcrum to adjust the speed ratio between said driving and driven shafts, said fulcrum being adjustable to a point on either side of said driven carrier, and means for reversing the action of said overrunning clutch, whereby to utilize said power stroke for imparting driving force to said driven shaft for both forward and reverse speeds of said driven shaft.

23. In a mechanical transmission, a drive shaft having a power cam and a return cam, first and second carrier members mounted to reciprocate on opposite sides of, and transversely of, said drive shaft, each carrier member having a power follower and a return follower, both said power followers engaging said power cam and both said return followers engaging said return cam, a driven shaft, means for using the reciprocating motion of said carrier members to drive said driven shaft.

24. In a mechanical transmission, a drive shaft having a power cam and a return cam, a carrier member, a straight path on which said carrier member is mounted to reciprocate, said carrier member having a power follower and a return follower, said power follower engaging said power cam and said return follower engaging said return cam, said power cam and said return cam having such contour as to impart a constant velocity motion to said carrier member for a portion of its cycle with constant angular velocity applied to said drive shaft, a driven shaft, means for using the constant velocity motion of said carrier member to drive said driven shaft at constant velocity.

25. In a mechanical transmission, a drive shaft having a power cam device and a return cam device, first and second carrier members, straight paths on which said carrier members are mounted to reciprocate, each carrier member having a power follower and a return follower, said power followers engaging said power cam device for causing said carriers to execute power strokes in one direction of their movement, and said return followers engaging said return cam device for causing said carriers to execute return strokes in the other direction of their movement, said cam devices being so shaped that said power strokes have constant linear velocity with constant angular velocity applied to said drive shaft, said power strokes overlapping, a driven shaft, means for using said overlapping power strokes of said carrier members to drive said driven shaft at constant angular velocity.

26. In a mechanical transmission, a drive shaft having a power cam and a return cam, said cams being of the plate type and substantially identical, a carrier member, a straight path on which said carrier member is mounted to reciprocate transversely of said drive shaft, said carrier member having a power follower and a return follower, said power follower engaging said power cam and said return follower engaging said return cam at substantially diametrically opposite sides of said drive shaft, said cams having such contours as to impart constant linear velocity to said carrier member for a portion of its movement when constant angular velocity is applied to said drive shaft, a driven shaft, means for using the constant linear motion of said carrier member to drive said driven shaft at constant velocity.

27. In a mechanical transmission, a drive shaft having a power cam and a return cam, said cams being substantially identical and having a uniform rise of more than 180° and a harmonic fall of less than 180°, first and second driving carriers mounted to slide on opposite sides of, and transversely of, said drive shaft, straight paths for said carriers, each carrier having a power follower and a return follower, said power followers engaging said power cam and said return followers engaging said return cam, a driven shaft, second paths parallel to said first paths, driven carriers mounted on opposite sides of said driven shaft, and transversely thereof, and slidable on said second paths, a pair of working beams, each beam connected to a set of driving and driven carriers, fulcrums for the respective working beams, means for adjusting said fulcrums to change the speed ratio of said driving and driven carriers, and overrunning clutches between said driven carriers and said driven shaft whereby said driven shaft partakes of substantially uniform angular velocity at all speed ratios with uniform angular velocity applied to said drive shaft.

28. In a mechanical transmission, a drive shaft having a power cam device and a return cam device, said cam devices being substantially identical and having a uniform rise of more than 180° and a harmonic fall of less than 180°, first and second driving carriers mounted to reciprocate transversely of said drive shaft, straight paths for said carriers, each carrier having a power follower and a return follower, said power followers engaging said power device, said return followers engaging said return cam device, a driven shaft, second paths parallel to said first paths, driven carriers mounted to reciprocate transversely of said driven shaft, and slidable on said second paths, a pair of working beams, each beam connected to a set of driving and driven carriers, fulcrums for the respective working beams, means for adjusting said fulcrums to change the speed ratio of said driving and driven carriers, and overrunning clutches between said driven carriers and said driven shaft, whereby said driven shaft partakes of substantially uniform angular velocity at all speed ratios with uniform angular velocity applied to said drive shaft.

29. In a variable speed transmission, a drive shaft, a reciprocating driving device having a constant speed power stroke and a variable speed return stroke driven by said drive shaft, a working beam driven by said driving device, a reciprocating driven device driven by said working beam, a driven shaft, an overrunning clutch driving said driven shaft and driven by said driven device, a fulcrum for said working beam, means for adjusting said fulcrum with respect to said working beam to positions between said driving and driven devices for variable forward speeds, means for adjusting said fulcrum to beyond one of said devices and means for reversing the action of said overrunning clutch to obtain variable reverse speeds.

30. In a mechanical transmission, a driving shaft having cam devices, two driving and two driven carriers mounted to reciprocate, each driving carrier having follower devices engaging said cam devices in such manner that said cam devices exert positive and continuous driving force on said follower devices during both forward and return strokes, two working beams, each beam connected to a set of driving and driven carriers, fulcrums for the respective working beams, means for adjusting said fulcrums to change the speed ratio of said driving and driven carriers, a driven shaft, power transmitting devices between said driven carriers and said driven shaft, said cam devices having portions of such rise as to impart uniform velocity to said driven carriers and other portions of such rise as to accelerate and decelerate said driven carriers at the ends of their strokes, the uniform velocity applied to each driven carrier corresponding to at least 180° of cam rotation and complementing the uniform velocity applied to the other driven carrier, whereby said driven shaft partakes of substantially uniform angular velocity at all speed ratios with uniform angular velocity applied to said drive shaft.

31. In a mechanical transmission, a driving shaft having cam devices, two driving and two driven carriers, straight line paths on which said carriers are mounted to reciprocate, each driving carrier having follower devices engaging said cam devices in such manner that said cam devices exert positive and continuous driving force on said follower devices during both forward and return strokes, two working beams each beam connected to a set of driving and driven carriers, fulcrums for the respective working beams, means for adjusting said fulcrums to change the speed ratio of said driving and driven carriers, a driven shaft, power transmitting devices between said driven carriers and said driven shaft, said cam devices having portions of such rise as to impart uniform velocity to said driving carriers and other portions of such rise as to accelerate and decelerate said driving carriers at the ends of their strokes, the uniform velocity applied to each driving carrier corresponding to at least 180 of cam rotation and complementing the uniform velocity applied to the other driving carrier whereby said driven shaft partakes of substantially uniform angular velocity at all speed ratios with uniform angular velocity applied to said drive shaft.

WILLIAM HORACE JOHNSON.